United States Patent
Mate et al.

(10) Patent No.: US 12,531,608 B2
(45) Date of Patent: Jan. 20, 2026

(54) ADAPTIVE HYBRID PRECODING STRATEGY FOR CELL-FREE MASSIVE MULTIPLE INPUT MULTIPLE OUTPUT

(71) Applicant: Telefonaktiebolaget LM Ericsson (publ), Stockholm (SE)

(72) Inventors: Dércio Manuel Mate, Manaus Amazonas (BR); Roberto Menezes Rodrigues, Belém Pará (BR); Gilvan Soares Borges, Belém Pará (BR); João C. Weyl Albuqerque Costa, Belém Pará (BR); Andre Mendes Cavalcante, Indaiatuba SP (BR); Maria Valéria Marquezini, Indaiatuba (BR); Igor Almeida, Indaiatuba-SP (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 83 days.

(21) Appl. No.: 18/562,218

(22) PCT Filed: May 25, 2021

(86) PCT No.: PCT/IB2021/054537
§ 371 (c)(1),
(2) Date: Nov. 17, 2023

(87) PCT Pub. No.: WO2022/248911
PCT Pub. Date: Dec. 1, 2022

(65) Prior Publication Data
US 2024/0250725 A1  Jul. 25, 2024

(51) Int. Cl.
*H04L 1/02* (2006.01)
*H04B 7/0452* (2017.01)
*H04B 7/0456* (2017.01)

(52) U.S. Cl.
CPC ......... *H04B 7/0478* (2013.01); *H04B 7/0452* (2013.01)

(58) Field of Classification Search
CPC ............. H04L 27/2601; H04L 25/0224; H04L 25/0212; H04B 7/0413; H04B 7/0695; H04B 7/0452; Y02D 30/70
(Continued)

(56) References Cited

U.S. PATENT DOCUMENTS

2019/0208575 A1*   7/2019   Barbieri ............ H04W 72/0446
2019/0274105 A1*   9/2019   Papa ..................... H04W 52/34
(Continued)

OTHER PUBLICATIONS

International Search Report and Written Opinion of the International Searching Authority, PCT/IB2021/054537, mailed Feb. 28, 2022, 13 pages.
(Continued)

*Primary Examiner* — Khai Tran
(74) *Attorney, Agent, or Firm* — Sage Patent Group

(57) ABSTRACT

A network node in a communications network can perform adaptive hybrid precoding. The network node can be communicatively coupled to an access point via a fronthaul. The network node can determine an amount of available bandwidth on the fronthaul. The network node can further determine whether to have the access point perform precoding of signals communicated between the access point and a communication device based on the amount of available bandwidth on the fronthaul. Responsive to determining whether to have the access point perform the precoding, the network node can transmit an indication to the access point indicating whether to perform the precoding.

18 Claims, 8 Drawing Sheets

(58) Field of Classification Search
USPC .......................................... 375/267, 260, 299
See application file for complete search history.

(56) References Cited

U.S. PATENT DOCUMENTS

2020/0403655 A1   12/2020  Zhou et al.
2023/0379193 A1*  11/2023  Wang .................. H04L 25/0224
2024/0204830 A1*   6/2024  Pjanic ............... H04L 25/03891

OTHER PUBLICATIONS

Patil, Pratik et al., "Hybrid Compression and Message-Sharing Strategy for the Downlink Cloud Radio-Access Network," 2014 Information Theory and Applications Workshop (ITA), IEEE, Feb. 9, 2014, 6 pages.
Björnson, Emil et al., "Scalable Cell-Free Massive MIMO Systems," IEEE Trans. Comm., vol. 68, No. 7, Jul. 2020, 15 pages.
Björnson, Emil et al., "Massive MIMO Networks: Spectral, Energy, and Hardware Efficiency", Foundations and Trends in Signal Processing, vol. 11, No. 3-4, 2017, 507 pages.
Björnson, Emil et al., "Massive MIMO for maximal spectral efficiency: How many users and pilots should be allocated?" IEEE Trans. Wireless Comm, vol. 15, No. 2, Feb. 2016, 16 pages.
Femenias, Gulillem et al., "Access Point Switch On/Off Strategies for Green Cell-Free Massive MIMO Networking," IEEE Access, vol. 8, 2020, 16 pages.
Interdonato, Giovanni et al., "Local partial zero-forcing precoding for cell-free massive MIMO," IEEE Trans. Wireless Comm, vol. 19, No. 7, Jul. 2020, 17 pages.

* cited by examiner

ADAPTIVE HYBRID PRECODING STRATEGY FOR CELL-FREE MASSIVE MULTIPLE INPUT MULTIPLE OUTPUT

CROSS REFERENCE TO RELATED APPLICATIONS

This application is a 35 U.S.C. § 371 national stage application of PCT International Application No. PCT/IB2021/054537 filed on May 25, 2021, the disclosure and content of which is incorporated by reference herein in its entirety.

TECHNICAL FIELD

The present disclosure relates generally to communications, and more particularly to communication methods and related devices and nodes supporting wireless communications.

BACKGROUND

FIG. 1 illustrates an example of a communication network with a network node 120 coupled to a core network 130 and to multiple communication devices 120 (also referred to herein as a user equipment ("UE")). In some examples, the communication network is a $5^{th}$ generation ("5G") network and the network node 120 is a 5G base station ("gNB"). The network node 120 can include or be coupled to an access point ("AP") (e.g., an antenna, transceiver, or router) that communicates signals to one or more of the UEs 110. In additional or alternative examples, the network node 120 can include or be coupled to multiple APs, which can be referred to a multiple-input-multiple-output ("MIMO") system.

One of the biggest challenges for distributed massive MIMO systems (sometimes referred to as cell-free massive MIMO systems, where massive number of APs are spread out over a coverage area) deployment is the development of efficient strategies for signal processing, which can be performed locally (sometimes referred to as distributed processing) at each AP or at a centralized location (e.g., in a central processing unit ("CPU") in the network node). In a distributed process, each access point ("AP") processes, individually, the signal from/to different UEs. This approach allows larger scalability, however, it suffers from a limitation of processing capacity imposed by the APs. In a centralized process, signal processing related to all APs is performed in a CPU in a network node, which benefits from larger processing capacity at the cost of fronthaul ("FH") limitation, due to channel state information ("CSI") overhead.

Precoding, which is an important signal processing procedure, uses CSI to maximize link performance, for example, employing suitable precoding may lead to large spectral and energy efficiency gains.

Maximum ratio transmission ("MRT") is presented as a simple and completely scalable solution for performing precoding in MIMO systems, due to its low complexity, which allows deployment in distributed scenarios. Furthermore, strategies such as local partial zero-forcing ("LPZF") and protective partial zero-forcing ("PPZF") are also presented as distributed solutions. Some robust precoding solutions based on the traditional minimum mean square error ("MMSE") algorithm are partial minimum mean square error ("PMMSE") and local partial minimum mean square error ("LP-MMSE"). Although they improve spectral efficiency over MRT, such strategies increase the complexity of the APs, making them challenging in distributed deployments.

SUMMARY

According to some embodiments, a method of operating a network node in a communications network for performing adaptive hybrid precoding is provided. The network node is communicatively coupled to an access point via a fronthaul. The method includes determining an amount of available bandwidth on the fronthaul. The method further includes determining whether to have the access point perform precoding of signals communicated between the access point and a communication device based on the amount of available bandwidth on the fronthaul. Responsive to determining whether to have the access point perform the precoding, transmit an indication to the access point indicating whether to perform the precoding.

According to other embodiments, a method of operating an access point in a communications network for performing adaptive hybrid precoding is provided. The access point is coupled to a network node via a fronthaul. The method includes receiving an indication from the network node indicating whether to perform precoding of signals communicated between the access point and a communication device. The method further includes communicating the signals between the network node and the communication device. Precoding of the signals is performed by the network node or the access point based on the indication.

According to other embodiments, a network node, access point, computer program, and/or computer program product is provided for performing one of the above methods.

There currently exist certain challenges with existing precoding procedures. In some examples, precoding procedures that improve spectral efficiency over MRT also increase the complexity of the APs. In additional or alternative examples, precoding procedures improve energy efficiency at a cost of reduced cell coverage.

Certain aspects of the disclosure and their embodiments may provide solutions to these or other challenges and may provide one or more of the following technical advantages: improved spectral efficiency; preserved simplicity of APs, efficient use of the FH; and reduction of energy consumption at the cell-site.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
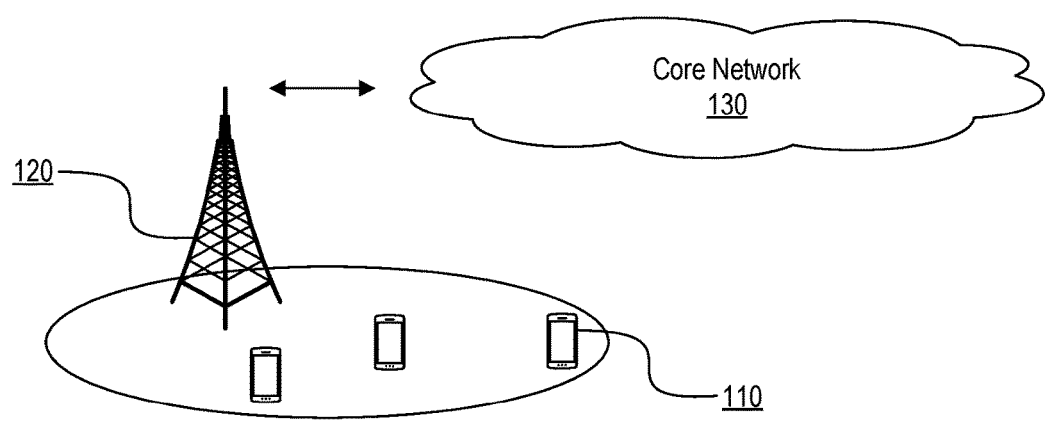
FIG. 1 is a schematic diagram illustrating an example of a communications network.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Hybrid solutions that exploit the advantages of both distributed and centralized signal processing schemes to perform precoding are essential, allowing a more efficient use of the FH available bandwidth and providing significant improvement in overall spectral efficiency.

Current procedures may propose a specific solution for each deployment. In some examples, the MRT precoding is presented as a feasible solution for distributed and scalable cell-free MIMO deployments. In additional or alternative examples, precoding solutions are presented as alternative to improve performance over MRT, however, at cost of high complexity in the AP side. In additional or alternative examples, a strategy to improve the spectral, energy, and hardware efficiency is proposed through an ON/OFF approach, which consists of periodically turning off the APs.

Although some of the current procedures described above may improve spectral efficiency over MRT, they increase the complexity of the APs, breaking the paradigm of simplicity of radio units in a centralized radio access network ("C-RAN") and/or improve energy efficiency at a cost of reduced cell coverage.

Accordingly, current procedures have no strategy to exploit adaptively, for example, based on a dynamic profile of the load on FH, the advantages of both distributed and centralized signal processing schemes to perform precoding.

Various embodiments herein aim to create a dynamic strategy for signal precoding in cell-free massive MIMO systems. In some embodiments, the proposed strategy aims to intelligently exploit the advantages of both distributed and centralized signal processing schemes to perform precoding. Therefore, the proposed strategy switching precoding between the APs and CPU adaptively, considering the instantaneous load on FH network. Thus, the precoding becomes hybrid, for example, distributed and centralized simultaneously, allowing a more efficient use of the FH available bandwidth and providing significant improvement in overall spectral efficiency. The adaptation of some proposed strategies depends on a FH traffic control mechanism. Thus, an entity responsible for the traffic monitoring may be deployed on the CPU. Parameters collected during the traffic monitoring may be used for making decision on where the precoding will be performed.

Some embodiments herein improve spectral efficiency. In some examples, switching precoding to the CPU allows the use of more robust precoders, such as MMSE, which improves the overall spectral efficiency.

Some embodiments herein preserve simplicity in APs. In some examples, the switched precoding APs operate as relays in some way. Moreover, the non-switched precoding APs use the simplest precoding scheme, MRT.

Some embodiments herein include efficient use of the FH. In some examples, in low traffic periods (e.g., when few users are connected) the FH load is low. Dynamic precoding switching allows exploitation of the reduction in network traffic to carry the control signal needed for performing robust precoding.

Some embodiments herein include a reduction of the energy consumption at the cell-site. In some examples, when the APs switch precoding to the CPU, some functionalities in these APs are turned off. Thus, the APs operate in a lighter mode with less power consumption. Thus, energy consumption in the cell-site can be reduced without compromising cell coverage.

Figure 2:
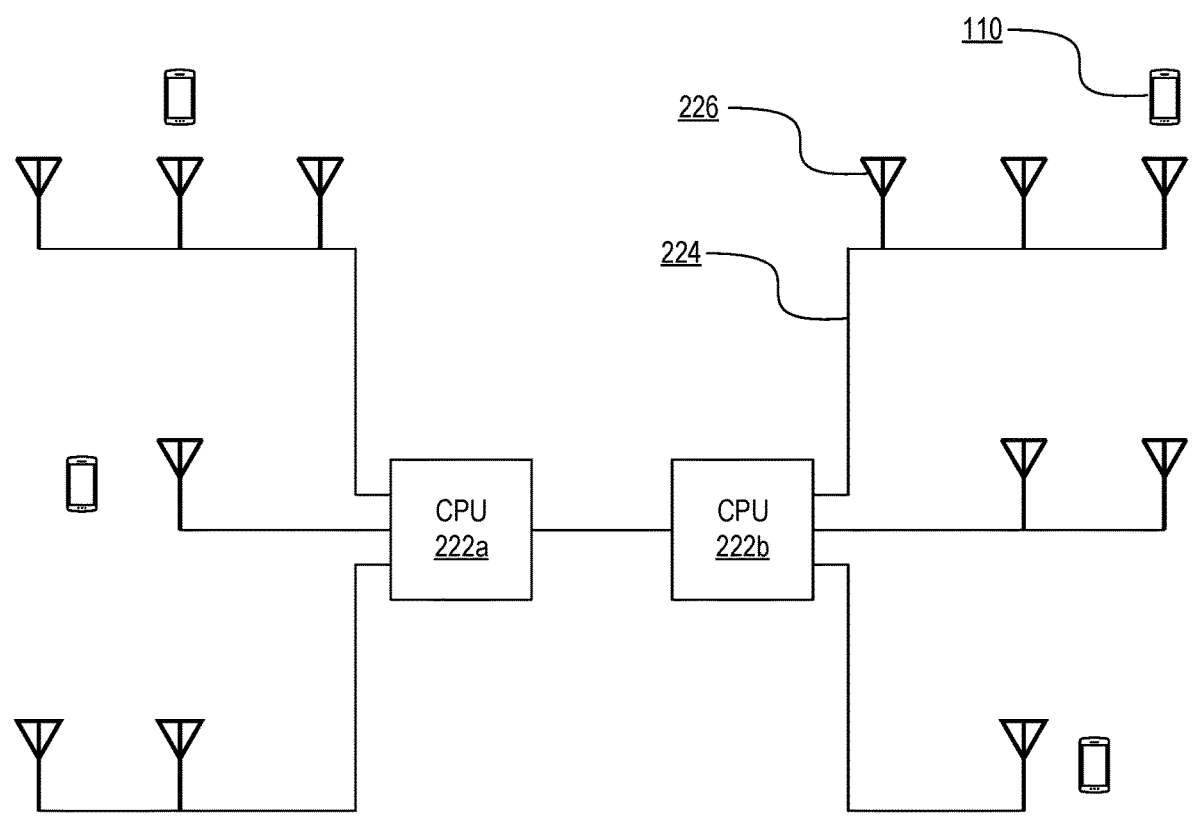
FIG. 2 is a schematic diagram illustrating an example of a cell-free massive MIMO system configured with a hybrid precoding procedure according to some embodiments of inventive concepts.

Various embodiments herein refer to performing an adaptive precoding in distributed massive MIMO systems, as illustrated in FIG. 2. APs 226 located at the cell-site send/receive signals to/from different UEs 110. All APs 226 have the ability to precode the signal in a distributed way, using simple schemes. However, in some embodiments, some selected APs 226 switch the precoding to their respective CPU 222*a-b* (centralized), in which more robust schemes can be used, allowing to improve the spectral efficiency. Therefore, the proposed process is hybrid (Distributed-Centralized). APs 226 which shift the precoding remain with basic functionalities such as frequency conversion, Analog-to-Digital ("AD") conversion and Digital-to-Analog ("DA") conversion. Thus, power consumption can be reduced in cell-site. The adaptive strategy takes into account the load on FH 224 shared by different APs 226, to decide how many APs 226 may switch the precoding to the CPU. In additional or alternative embodiments, the precoding switching for APs 226 is based on whose average spectral efficiency is lower. Simulation results showed that this approach provides significant gain in spectral efficiency.

In some embodiments, a channel is assumed to be reciprocal such that uplink ("UL") pilot tones are used to estimate a downlink ("DL") channel. In additional or alternative embodiments, the CPU has no power restrictions or processing capacity restrictions. A proposed process can be described in the following two phases: a training phase (at the APs) and an execution phase (at the CPU).

During the training phase, UEs send the pilot tones to the APs for UL channel estimation. Then, all APs perform the precoding for DL transmission in a distributed way. During the training period, the average spectral efficiency of all the APs is calculated. This average can be used later for making a decision.

During the execution phase, traffic in the FH can be monitored. UE data rates ($UE_{rates}$) generated in the cell-site can be converted into FH load. The CPU can monitor the instantaneous FH load:

$$FH_{load} = \alpha \times UR_{rates},$$

where $\alpha$ is the rate conversion factor.

After monitoring the traffic, the CPU can make a decision whether to shift the precoding. In some examples, the CPU compares a maximum FH link capacity ($FH_{capacity}$) and an FH load generated by the UEs ($FH_{load}$). If $FH_{load} = FH_{capacity}$ precoding of all APs remains in cell-site (e.g., it is performed in a distributed way as in training phase). If $FH_{load} < FH_{capacity}$ the available FH bandwidth is calculated, which is given by the difference between $FH_{capacity}$ and $FH_{load}$ ($FH_{available\_bandwidth} = FH_{capacity} - FH_{load}$). In additional or alternative examples, the CPU calculates the number ($Nr_{AP\_S}$) of APs which may shift the precoding:

$$Nr_{AP_S} = \frac{FH_{available_{bandwidth}}}{CE_{overhead}}$$

where $CE_{overhead}$ is the channel estimation overhead generated by each AP.

In additional or alternative embodiments, the CPU selects $Nr_{AP\_S}$ APs and switch precoding. The non-switched APs remain with distributed precoding.

In some embodiments, instead of switching randomly, this process also proposes to switch the APs which provide a low average spectral efficiency (calculated and stored in the training phase), in an ascendant order. Simulation showed significant gains in terms of spectral efficiency with this approach (worst average criterion).

Figure 3:
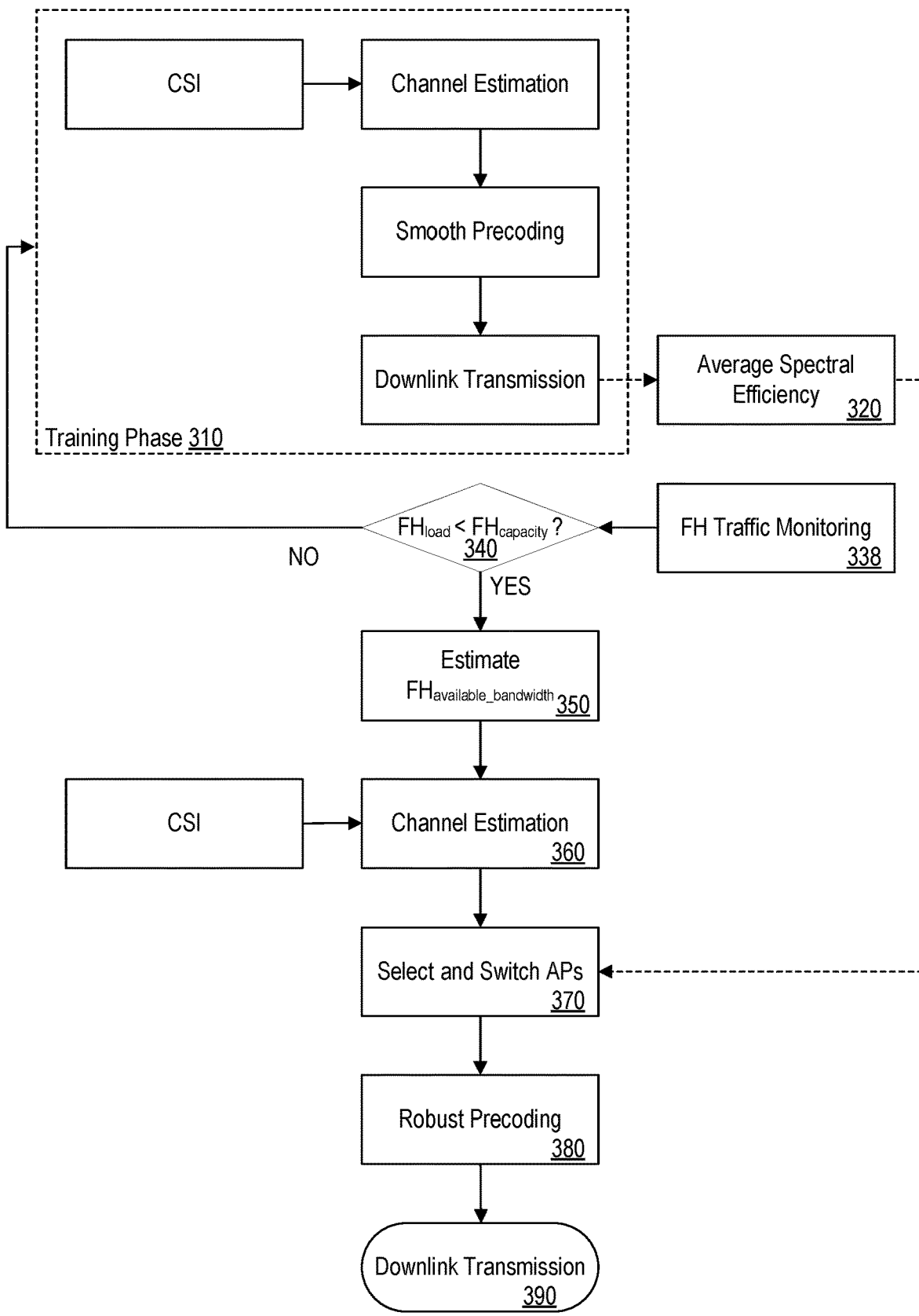
FIG. 3 is a flow chart illustrating an example of the hybrid precoding procedure according to some embodiments of inventive concepts.

FIG. 3 is a flowchart illustrating an example of a switching process of APs coupled to a network node via a common fronthaul. In some examples, during a training phase 310, the APs can each receive channel state information ("CSI") from one or more UEs, perform channel estimations, perform precoding for downlink transmissions to the one or more UEs, and transmit the downlink transmissions to the one or more UEs. At block 338, the network node can monitor traffic on the fronthaul and, as a result of the training phase, at block 320, the network node can determine an average spectral efficiency for each AP. At block 340, the network node can determine whether a load on the fronthaul is less than a maximum capacity of the fronthaul. If not, the network node can instruct the APs to perform the training phase 310. If the load on the fronthaul is less than a maximum capacity of the fronthaul, at block 350, the network node estimates an available bandwidth of the fronthaul.

At block 360, the network node receives CSI and uses the CSI to determine channel estimation overhead associated with each AP. At block 370, the network node can select a set of APs to switch precoding from distributed/local to centralized. The number of APs in the set of APs can be based on the available bandwidth of the fronthaul and the channel estimation overhead associated with each AP. Selection of specific APs to switch precoding from distributed/local to centralized can be based on information associated with each of the APs (e.g., an average spectral efficiency).

At block 380, the network node can perform robust precoding for signals being communicated with communication devices via the switched APs. At block 390, the network node can provide signals for downlink transmission to the APs (precoded signals for switched APs and non-precoded signals for unswitched APs).

Various embodiments herein describe a traffic monitoring-based strategy for precoding the signal in cell-free massive MIMO. In some embodiments, a group of APs switch precoding to the CPU, depending on the bandwidth availability in FH. In additional or alternative embodiments, the APs with the worst performance (e.g., with lower average spectral efficiency) are prioritized in decision making. In additional or alternative embodiments, precoding is performed in a hybrid way, using a more robust precoder in the CPU and a less robust precoder in the APs, simultaneously.

Figure 4:
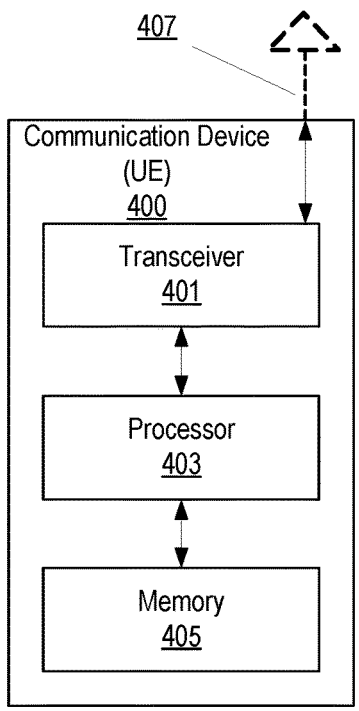
FIG. 4 is a block diagram illustrating a communication device ("UE") according to some embodiments of inventive concepts.

FIG. 4 is a block diagram illustrating elements of a communication device ("UE") 400 (also referred to as a mobile terminal, a mobile communication terminal, a wireless device, a wireless communication device, a wireless terminal, mobile device, a wireless communication terminal, user equipment, a user equipment node/terminal/device, etc.) configured to provide wireless communication according to embodiments of inventive concepts. (Communication device 400 may be provided, for example, as discussed below with respect to wireless devices UE 1012A, UE 1012B, and wired or wireless devices UE 1012C, UE 1012D of FIG. 10, UE 1100 of FIG. 11, virtualization hardware 1404 and virtual machines 1408A, 1408B of FIG. 14, and UE 1506 of FIG. 15, all of which should be considered interchangeable in the examples and embodiments described herein and be within the intended scope of this disclosure, unless otherwise noted.) As shown, communication device may include an antenna 307 (e.g., corresponding to antenna 1122 of FIG. 11), and transceiver circuitry 301 (also referred to as a transceiver, e.g., corresponding to interface 1112 of FIG. 11 having transmitter 1118 and receiver 1120) including a transmitter and a receiver configured to provide uplink and downlink radio communications with a base station(s) (e.g., corresponding to network node 1010A, 1010B of FIG. 10, network node 1200 of FIG. 12, and network node 1504 of FIG. 15 also referred to as a RAN node) of a radio access network. Communication device may also include processing circuitry 403 (also referred to as a processor, e.g., corresponding to processing circuitry 1102 of FIG. 11, and control system 1412 of FIG. 14) coupled to the transceiver circuitry, and memory circuitry 405 (also referred to as memory, e.g., corresponding to memory 1110 of FIG. 10) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that separate memory circuitry is not required. Communication device UE may also include an interface (such as a user interface) coupled with processing circuitry 403, and/or communication device may be incorporated in a vehicle.

As discussed herein, operations of the communication device 400 may be performed by processing circuitry 403 and/or transceiver circuitry 401. For example, processing circuitry 403 may control transceiver circuitry 401 to transmit communications through transceiver circuitry 401 over a radio interface to a radio access network node (also referred to as a base station) and/or to receive communications through transceiver circuitry 401 from a RAN node over a radio interface. Moreover, modules may be stored in memory circuitry 405, and these modules may provide instructions so that when instructions of a module are executed by processing circuitry 403, processing circuitry 403 performs respective operations (e.g., operations discussed below with respect to Example Embodiments relating to wireless communication devices). According to some embodiments, a communication device UE 400 and/or an element(s)/function(s) thereof may be embodied as a virtual node/nodes and/or a virtual machine/machines.

Figure 5:
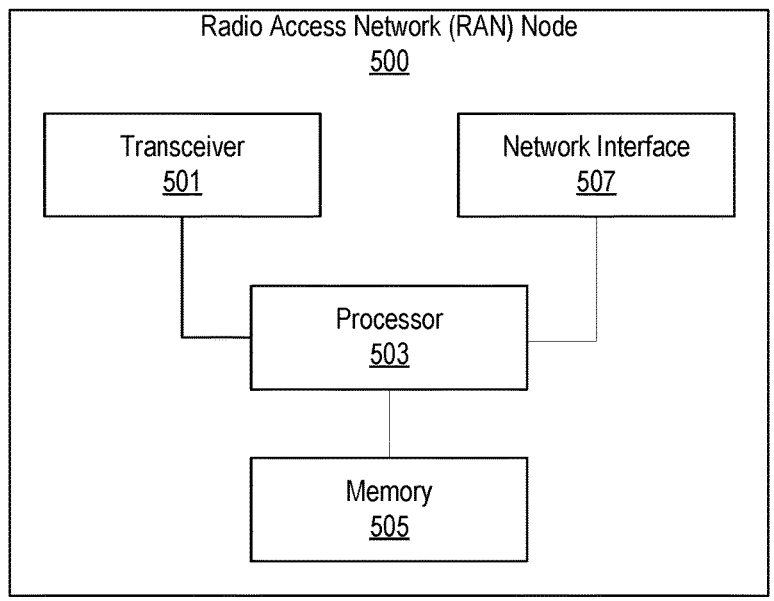
FIG. 5 is a block diagram illustrating a radio access network ("RAN") node (e.g., a base station eNB/gNB) according to some embodiments of inventive concepts.

FIG. 5 is a block diagram illustrating elements of a radio access network ("RAN") node 500 (also referred to as a network node, base station, eNodeB/eNB, gNodeB/gNB, etc.) of a RAN configured to provide cellular communication according to embodiments of inventive concepts. (RAN node 500 may be provided, for example, as discussed below with respect to network node 1010A, 1010B of FIG. 10, network node 1200 of FIG. 3, hardware 1404 or virtual machine 1408A, 1408B of FIG. 14, and/or base station 1504 of FIG. 15, all of which should be considered interchangeable in the examples and embodiments described herein and be within the intended scope of this disclosure, unless otherwise noted.) As shown, the RAN node may include transceiver circuitry 501 (also referred to as a transceiver, e.g., corresponding to portions of RF transceiver circuitry 1212 and radio front end circuitry 1218 of FIG. 12) including a transmitter and a receiver configured to provide uplink and downlink radio communications with mobile terminals. The RAN node 500 may include network interface circuitry 507 (also referred to as a network interface, e.g., corresponding to portions of communication interface 1206 of FIG. 12) configured to provide communications with other nodes (e.g., with other base stations) of the RAN and/or core network. The RAN node 500 may also include processing circuitry 503 (also referred to as a processor, e.g., corresponding to processing circuitry 1202 of FIG. 12) coupled to the transceiver circuitry, and memory circuitry 505 (also referred to as memory, e.g., corresponding to memory 1204 of FIG. 12) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the RAN node 500 may be performed by processing circuitry 503, network interface 507, and/or transceiver 501. For example, processing circuitry 503 may control transceiver 501 to transmit downlink communications through transceiver 501 over a radio interface to one or more mobile terminals and/or to receive uplink communications through transceiver 501 from one or more mobile terminals over a radio interface. Similarly, processing circuitry 503 may control network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations. According to some embodiments, RAN node 500 and/or an element(s)/function (s) thereof may be embodied as a virtual node/nodes and/or a virtual machine/machines.

According to some other embodiments, a network node may be implemented as a core network node without a transceiver. In such embodiments, transmission to a wireless communication device may be initiated by the network node so that transmission to the wireless communication device is provided through a network node including a transceiver (e.g., through a base station or RAN node). According to embodiments where the network node is a RAN node including a transceiver, initiating transmission may include transmitting through the transceiver.

Figure 6:
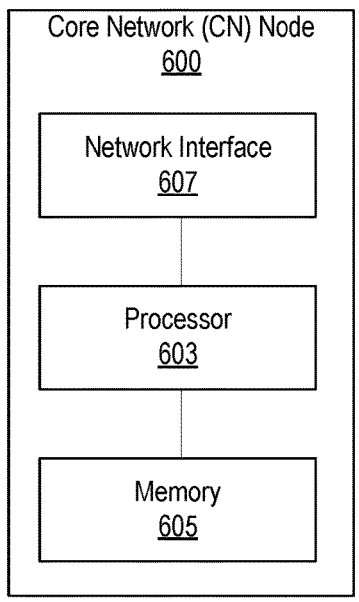
FIG. 6 is a block diagram illustrating a core network ("CN") node (e.g., an AMF node, an SMF node, etc.) according to some embodiments of inventive concepts.

FIG. 6 is a block diagram illustrating elements of a core network ("CN") node (e.g., a session management function ("SMF") node, an access and mobility management function ("AMF") node, etc.) of a communication network configured to provide cellular communication according to embodiments of inventive concepts. (CN node 600 may be provided, for example, as discussed below with respect to core network node 1008 of FIG. 10, hardware 1404 or virtual machine 1408A, 1408B of FIG. 14, all of which should be considered interchangeable in the examples and embodiments described herein and be within the intended scope of this disclosure, unless otherwise noted). As shown, the CN node 600 may include network interface circuitry 607 configured to provide communications with other nodes of the core network and/or the RAN. The CN node 600 may also include a processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the CN node 600 may be performed by processing circuitry 603 and/or network interface circuitry 607. For example, processing circuitry 603 may control network interface circuitry 607 to transmit communications through network interface circuitry 607 to one or more other network nodes and/or to receive communications through network interface circuitry from one or more other network nodes. Moreover, modules may be stored in memory 605, and these modules may provide instructions so that when instructions of a module are executed by processing circuitry 603, processing circuitry 603 performs respective operations. According to some embodiments, CN node 600 and/or an element(s)/function (s) thereof may be embodied as a virtual node/nodes and/or a virtual machine/machines.

Figure 7:
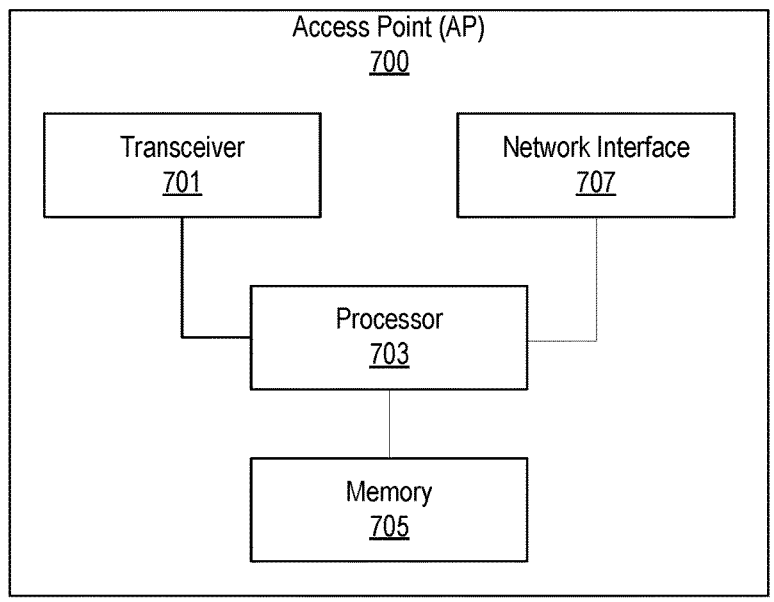
FIG. 7 is a block diagram illustrating an example of an access point (e.g., an antenna, transceiver, router, etc.) according to some embodiments of inventive concepts.

FIG. 7 is a block diagram illustrating elements of an access point ("AP") 700 of a communication network configured to provide cellular communication according to embodiments of inventive concepts. (AP 700 may be provided, for example, as discussed below with respect to hub 1014 of FIG. 10, which should be considered interchangeable in the examples and embodiments described herein and be within the intended scope of this disclosure, unless otherwise noted). As shown, the AP 700 may include transceiver circuitry 701 (also referred to as a transceiver, e.g., corresponding to portions of RF transceiver circuitry 1212 and radio front end circuitry 1218 of FIG. 12) including a transmitter and a receiver configured to provide uplink and downlink radio communications with mobile terminals. In some embodiments, the AP 700 is a portion of a transceiver of a RAN node (e.g., transceiver 501 of RAN node 500). The AP 700 may also include network interface circuitry 707 configured to provide communications with other nodes of a network (e.g., a RAN node of the RAN). The AP 700 may also include a processing circuitry 703 (also referred to as a processor) coupled to the network interface circuitry, and memory circuitry 705 (also referred to as memory) coupled to the processing circuitry 703. The memory circuitry 705 may include computer readable program code that when executed by the processing circuitry 703 causes the processing circuitry 703 to perform operations according to embodiments disclosed herein. According to other embodiments, processing circuitry 703 may be defined to include memory so that a separate memory circuitry is not required.

As discussed herein, operations of the AP 700 may be performed by processing circuitry 703 and/or network interface circuitry 707. For example, processing circuitry 703 may control transceiver 701 to transmit downlink communications through transceiver 701 over a radio interface to one or more mobile terminals and/or to receive uplink communications through transceiver 701 from one or more mobile terminals over a radio interface. Similarly, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations. According to some embodiments, AP 700 and/or an element(s)/function(s) thereof may be embodied as a virtual node/nodes and/or a virtual machine/machines.

In the description that follows, while the network node may be any of the RAN node 500, network node 1010A, 1010B, 1200, 1506, hardware 1404, virtual machine 1408A, 1408B, CN node 600, core network node 1008, hardware 1404, or virtual machine 1408A, 1408B, the RAN node 500 shall be used to describe the functionality of the operations of the network node. Operations of the RAN node 500 (implemented using the structure of FIG. 5) will now be discussed with reference to the flow chart of FIG. 8 according to some embodiments of inventive concepts. For example, modules may be stored in memory 505 of FIG. 5, and these modules may provide instructions so that when the instructions of a module are executed by respective RAN node processing circuitry 503, processing circuitry 503 performs respective operations of the flow chart.

Figure 8:
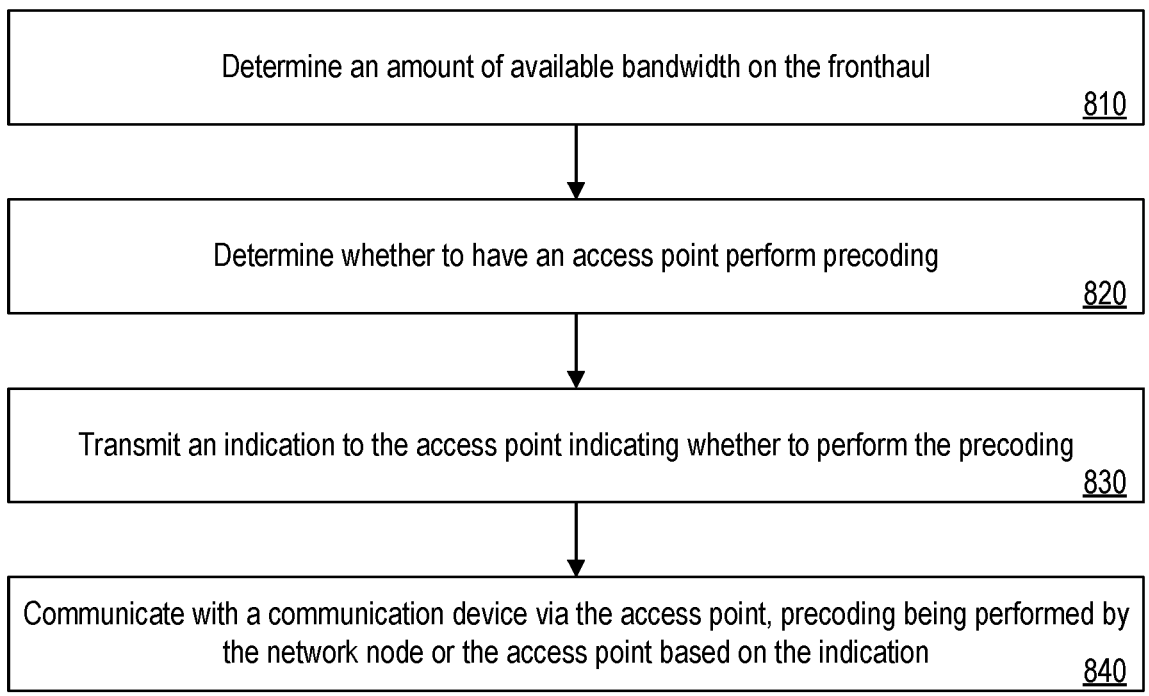
FIG. 8 is a flow chart illustrating an example of operations of a network node according to some embodiments of inventive concepts.

FIG. 8 illustrates an example of operations performed by a network node (e.g., RAN node 500) in a communications network for performing adaptive hybrid precoding. The network node can be communicatively coupled to an access point via a fronthaul. In some embodiments, the communications network is a cell-free massive multiple-input-multiple-output, MIMO, system. In additional or alternative embodiments, the network node comprises at least one of a radio access network, RAN, node and a core network, CN, node.

At block 810, processing circuitry 503 determines an amount of available bandwidth on the fronthaul. In some embodiments, determining the amount of available bandwidth on the fronthaul includes determining a load on the fronthaul and determining the available bandwidth on the fronthaul based on the load on the fronthaul and a capacity of the fronthaul. In additional or alternative embodiments, determining the load on the fronthaul includes instructing the access point to perform a training phase in which at least one communication device transmits pilot tones to the access point for uplink channel estimation and the access point performs precoding for downlink transmission to at least one communication device. Determining the load on the fronthaul further includes monitoring traffic on the fronthaul during the training phase and determining the load on the fronthaul based on the traffic.

At block 820, processing circuitry 503 determines whether to have an access point perform precoding. In some embodiments, the access point is a first access point of a plurality of access points communicatively coupled to the network node via the fronthaul. Determining whether to have the access point perform the precoding includes determining a channel estimation overhead generated by each access point of the plurality of access points and determining a number of access points of the plurality of access points for which the network node will perform precoding of signals associated with the first set of access points. The number is based on the available bandwidth of the fronthaul and the channel estimation overhead generated by each access point of the plurality of access points.

At block 830, processing circuitry 503 transmits, via transceiver 501 or network interface 507, an indication to the access point indicating whether to perform the precoding.

In some embodiments, determining whether to have the access point perform the precoding further includes determining a first set of access points of the plurality of access points for which the network node will perform the precoding of signals associated with the first set of access points. The first set of access points has the number of access points. Transmitting the indication to the access point includes transmitting the indication to each access point of the first set of access points indicating that the network node will perform the precoding of signals associated with the first set of access points. In additional or alternative embodiments, determining the first set of access points includes determining the first set of access points based on at least one of: an average spectral efficiency associated with each access point of the plurality of access points, a power capability associated with each access point of the plurality of access points, hardware associated with each access point of the plurality of access points, a user load associated with each access point of the plurality of access points, and a number of hops along the fronthaul from the network node to each access point of the plurality of access points.

In additional or alternative embodiments, determining whether to have the access point perform the precoding further includes determining a second set of access points of the plurality of access points for which each access point of the second set of the access points will perform the precoding of signals associated with the respective access point. The second set of access points is based on the number of access points. Transmitting the indication to the access point includes transmitting the indication to each access point of the second set of access points indicating that the respective access point will perform the precoding of signals associated with the respective access point.

In additional or alternative embodiments, the network node includes a more robust precoder and the access point includes a less robust precoder.

At block 840, processing circuitry 503 communicates, via the access point, with the communication device. In some examples, precoding is performed by the network node or the access point based on the indication.

Various operations from the flow chart of FIG. 8 may be optional with respect to some embodiments of network nodes (e.g., RAN nodes, CN nodes, or a combination thereof) and related methods. For example, operations of block 840 of FIG. 8 may be optional.

In the description that follows, while the access point may be any of the access point 700 (which may be part of a RAN node) or a hub 1014, the access point 700 shall be used to describe the functionality of the operations of the access point. Operations of the access point 700 (implemented using the structure of FIG. 7) will now be discussed with reference to the flow chart of FIG. 9 according to some embodiments of inventive concepts. For example, modules may be stored in memory 705 of FIG. 7, and these modules may provide instructions so that when the instructions of a module are executed by respective access point processing circuitry 703, processing circuitry 703 performs respective operations of the flow chart.

Figure 9:
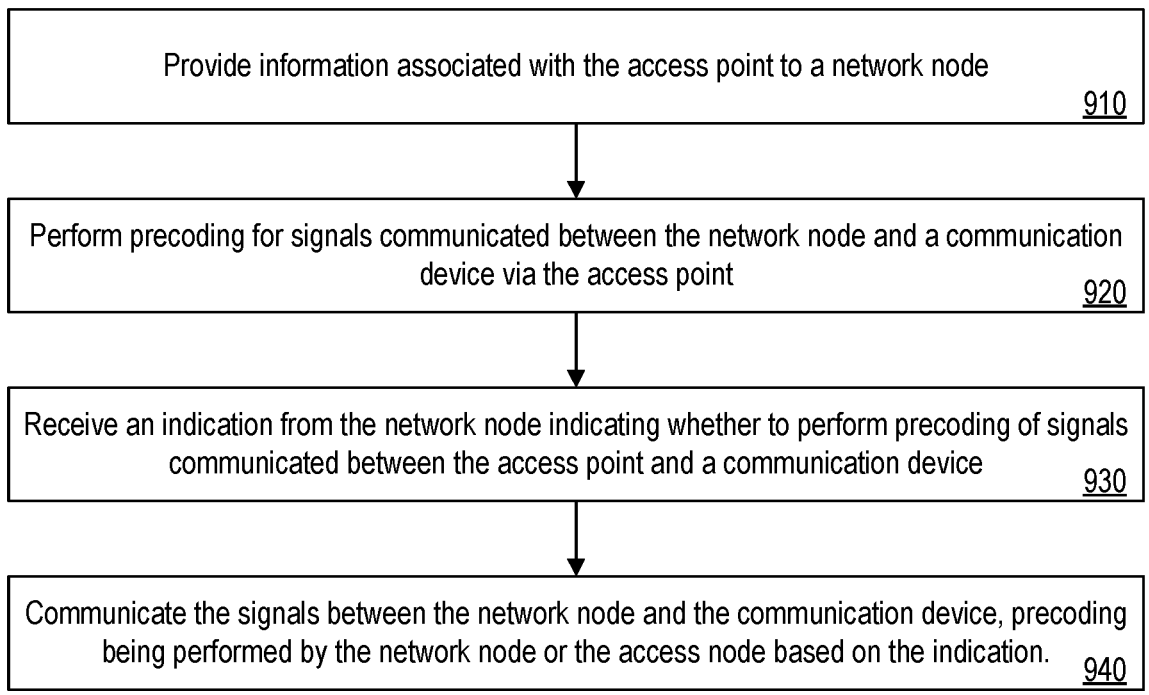
FIG. 9 is a flow chart illustrating an example of operations of an access point according to some embodiments of inventive concepts.

FIG. 9 illustrates an example of operations performed by an access point (e.g., AP 700) in a communications network for performing adaptive hybrid precoding. The access point is coupled to a network node via a fronthaul. In some embodiments, the communications network is a cell-free massive multiple-input-multiple-output, MIMO, system. In additional or alternative embodiments, the network node comprises at least one of a radio access network, RAN, node and a core network, CN, node.

At block 910, processing circuitry 703 provides information associated with the access point to a network node. In some embodiments, the information includes at least one of: a power capability of the access point, hardware of the access point, and a user load associated with the access point.

At block 920, processing circuitry 703 performs precoding for signals communicated between the network node and a communication device via the access point. In some embodiments, performing the precoding for the signals communicated between the network node and the second communication device via the access point includes receiving instructions from the network node to perform a training phase; receiving pilot tones from the second communication device; and precoding a signal for downlink transmission to the second communication device.

At block 930, processing circuitry 703 receives an indication from the network node indicating whether to perform precoding of signals communicated between the access point and a communication device.

At block 940, processing circuitry 703 communicates, via transceiver 701 and/or the network interface 707, the signals between the network node and the communication device. In some examples, precoding is performed by the network node or the access node based on the indication.

Various operations from the flow chart of FIG. 9 may be optional with respect to some embodiments of access points and related methods. For example, operations of blocks 910 and 920 of FIG. 9 may be optional.

Figure 10:
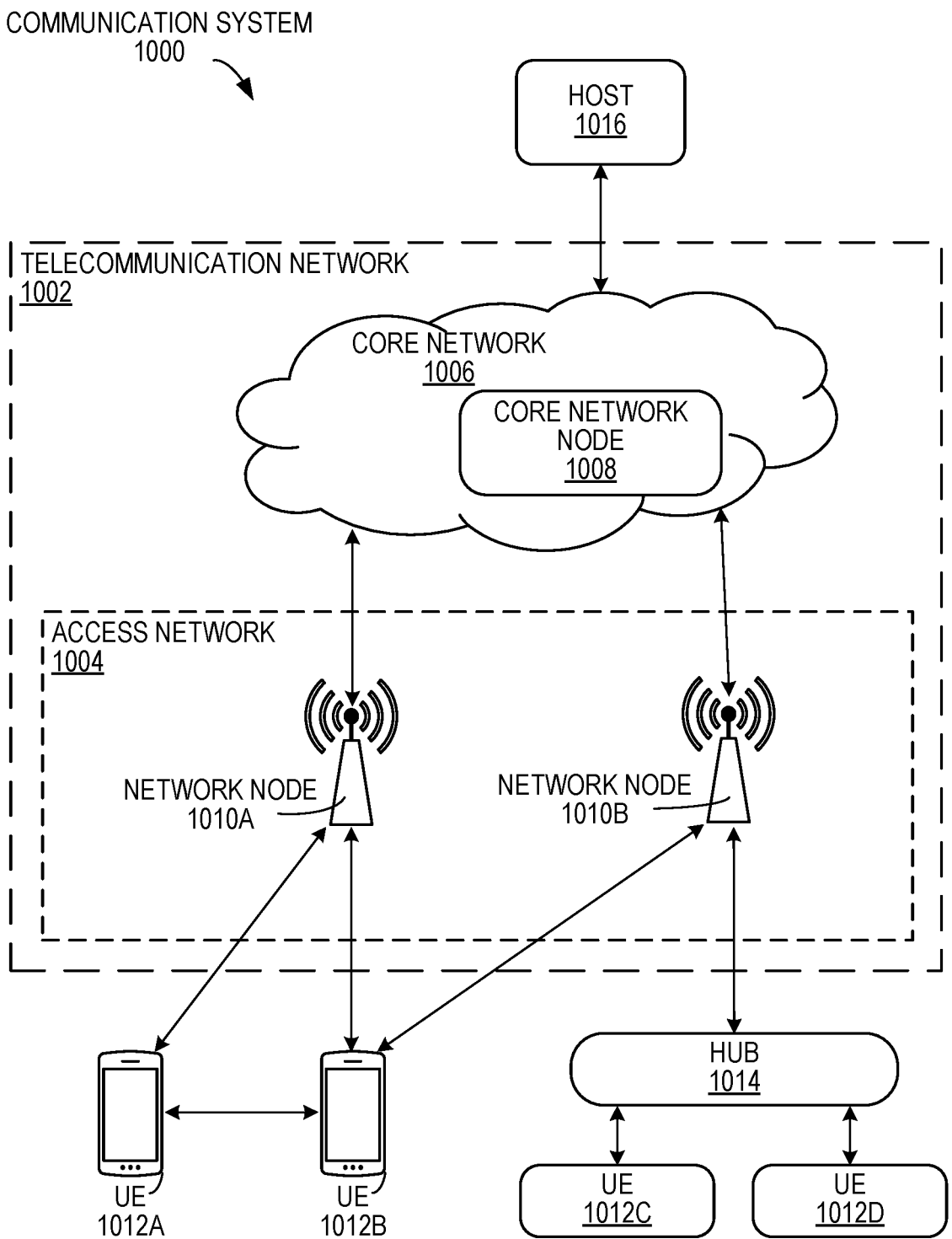
FIG. 10 is a block diagram of a communication system in accordance with some embodiments.

FIG. 10 shows an example of a communication system 1000 in accordance with some embodiments. In some examples, the hub 1014 is an example of an access point (e.g., access point 700).

In the example, the communication system 1000 includes a telecommunication network 1002 that includes an access network 1004, such as a radio access network (RAN), and a core network 1006, which includes one or more core network nodes 1008. The access network 1004 includes one or more access network nodes, such as network nodes 1010*a* and 1010*b* (one or more of which may be generally referred to as network nodes 1010), or any other similar $3^{rd}$ Generation Partnership Project (3GPP) access node or non-3GPP access point. The network nodes 1010 facilitate direct or indirect connection of user equipment (UE), such as by connecting UEs 1012*a*, 1012*b*, 1012*c*, and 1012*d* (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1016 may be under the ownership or control of a service provider other than an operator or provider of the access network 1004 and/or the telecommunication network 1002, and may be operated by the service provider or on behalf of the service provider. The host 1016 may host a variety of applications to provide one or more service.

Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1014 communicates with the access network 1004 to facilitate indirect communication between one or more UEs (e.g., UE 1012c and/or 1012d) and network nodes (e.g., network node 1010b). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to one or more actuators in the UEs. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy IoT devices.

The hub 1014 may have a constant/persistent or intermittent connection to the network node 1010b. The hub 1014 may also allow for a different communication scheme and/or schedule between the hub 1014 and UEs (e.g., UE 1012c and/or 1012d), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010b. In other embodiments, the hub 1014 may be a non-dedicated hub—that is, a device which is capable of operating to route communications between the UEs and network node 1010b, but which is additionally capable of operating as a communication start and/or end point for certain data channels.

Figure 11:
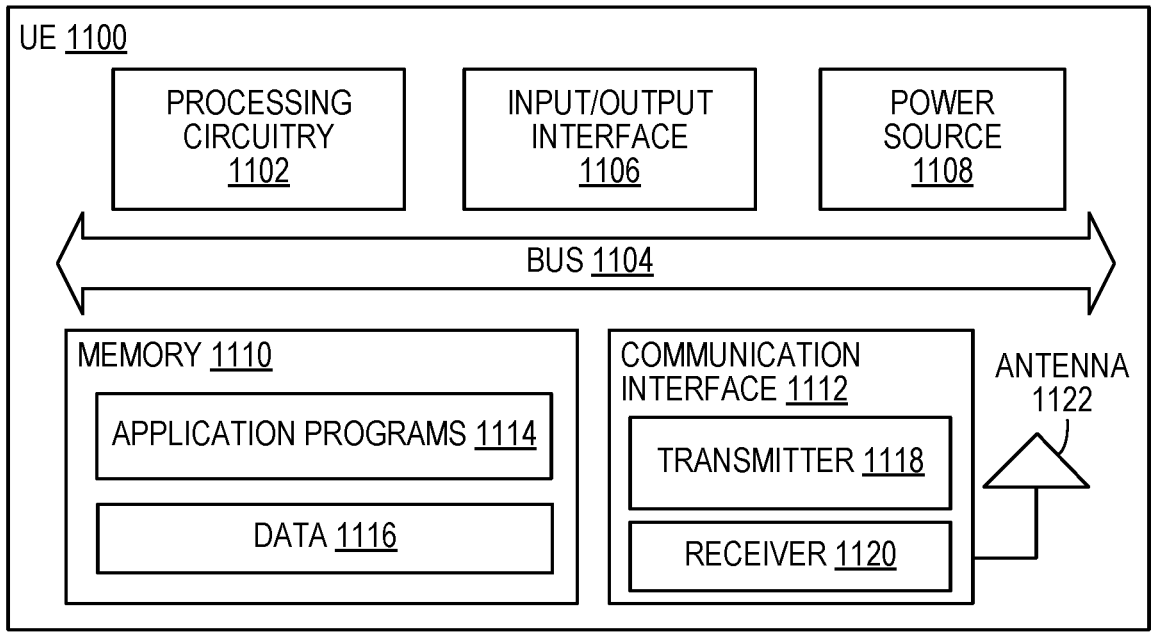
FIG. 11 is a block diagram of a user equipment in accordance with some embodiments

FIG. 11 shows a UE 1100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1100 includes processing circuitry 1102 that is operatively coupled via a bus 1104 to an input/output interface 1106, a power source 1108, a memory 1110, a communication interface 1112, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 1102 is configured to process instructions and data and may be configured to implement any sequential state machine operative to execute instructions stored as machine-readable computer programs in the memory 1110. The processing circuitry 1102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1102 may include multiple central processing units (CPUs).

In the example, the input/output interface 1106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1108 is structured as a battery or battery pack. Other types of power sources, such as an external power source (e.g., an electricity outlet), photovoltaic device, or power cell, may be used. The power source 1108 may further include power circuitry for delivering power from the power source 1108 itself, and/or an external power source, to the various parts of the UE 1100 via input circuitry or an interface such as an electrical power cable. Delivering power may be, for example, for charging of the power source 1108. Power circuitry may perform any formatting, converting, or other modification to the power from the power source 1108 to make the power suitable for the respective components of the UE 1100 to which power is supplied.

The memory 1110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1110 includes one or more application programs 1114, such as an operating system, web browser application, a widget, gadget engine, or other application, and corresponding data 1116. The memory 1110 may store, for use by the UE 1100, any of a variety of various operating systems or combinations of operating systems.

The memory 1110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1110 may allow the UE 1100 to access instructions, application programs and the like, stored on transitory or non-transitory memory media, to off-load data, or to upload data. An article of manufacture, such as one utilizing a communication system may be tangibly embodied as or in the memory 1110, which may be or comprise a device-readable storage medium.

The processing circuitry 1102 may be configured to communicate with an access network or other network using the communication interface 1112. The communication interface 1112 may comprise one or more communication subsystems and may include or be communicatively coupled to an antenna 1122. The communication interface 1112 may include one or more transceivers used to communicate, such as by communicating with one or more remote transceivers of another device capable of wireless communication (e.g., another UE or a network node in an access network). Each transceiver may include a transmitter 1118 and/or a receiver 1120 appropriate to provide network communications (e.g., optical, electrical, frequency allocations, and so forth). Moreover, the transmitter 1118 and receiver 1120 may be coupled to one or more antennas (e.g., antenna 1122) and may share circuit components, software or firmware, or alternatively be implemented separately.

In the illustrated embodiment, communication functions of the communication interface 1112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1100 shown in FIG. 11.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
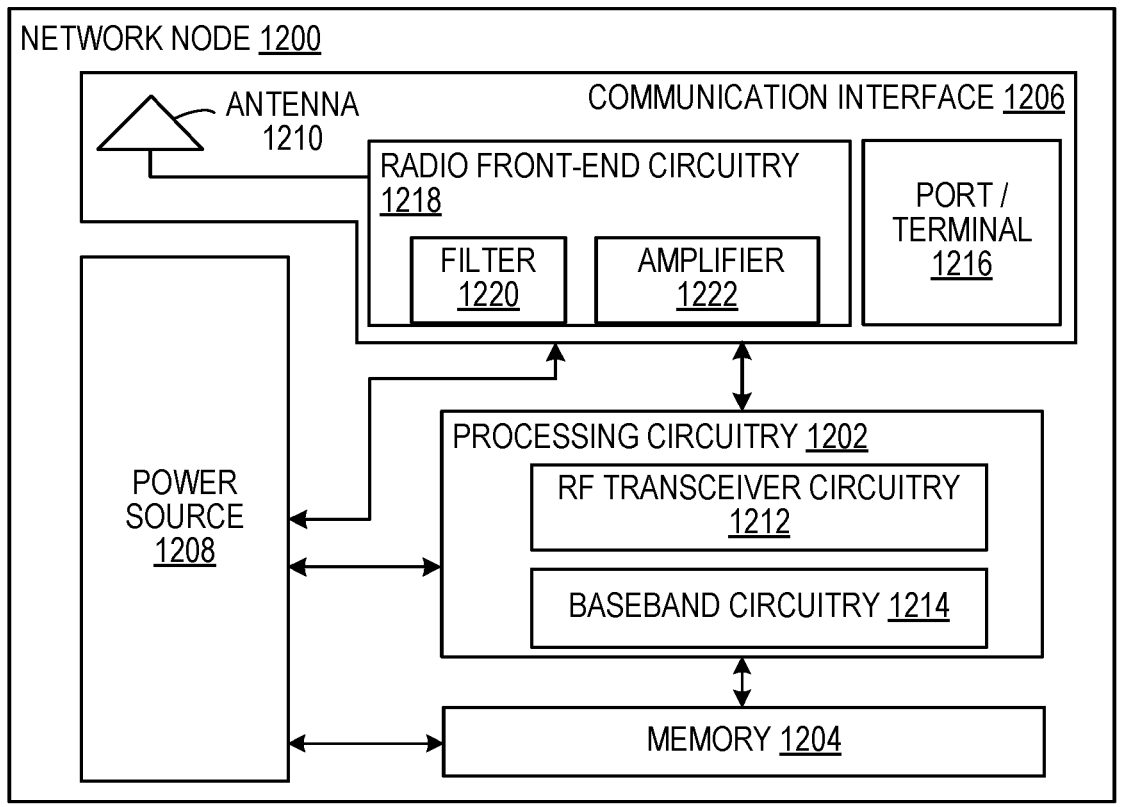
FIG. 12 is a block diagram of a network node in accordance with some embodiments.

FIG. 12 shows a network node 1200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1200 includes a processing circuitry 1202, a memory 1204, a communication interface 1206, and a power source 1208. The network node 1200 may be composed of multiple physically separate components (e.g., a NodeB component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g., separate memory 1204 for different RATs) and some components may be reused (e.g., a same antenna 1210 may be shared by different RATs). The network node 1200 may also include multiple sets of the various illustrated components for different wireless technologies integrated into network node 1200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions capable of being executed by the processing circuitry 1202 and utilized by the network node 1200. The memory 1204 may be used to store any calculations made by the processing circuitry 1202 and/or any data received via the communication interface 1206. In some embodiments, the processing circuitry 1202 and memory 1204 is integrated.

The communication interface 1206 is used in wired or wireless communication of signaling and/or data between a network node, access network, and/or UE. As illustrated, the communication interface 1206 comprises port(s)/terminal(s) 1216 to send and receive data, for example to and from a network over a wired connection. The communication interface 1206 also includes radio front-end circuitry 1218 that may be coupled to, or in certain embodiments a part of, the antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g., at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g., the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
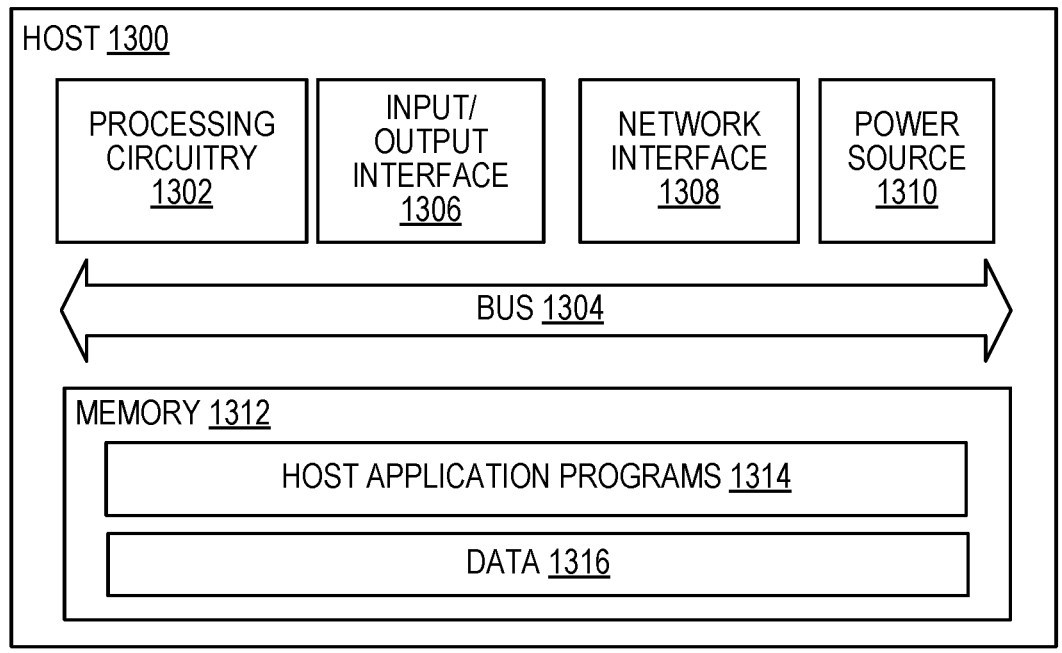
FIG. 13 is a block diagram of a host computer communicating with a user equipment in accordance with some embodiments.

FIG. 13 is a block diagram of a host 1300, which may be an embodiment of the host 1016 of FIG. 10, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 11 and 12, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network. Accordingly, the host 1300 may select and/or indicate a different host for over-the-top services for a UE. The host application programs 1314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 14:
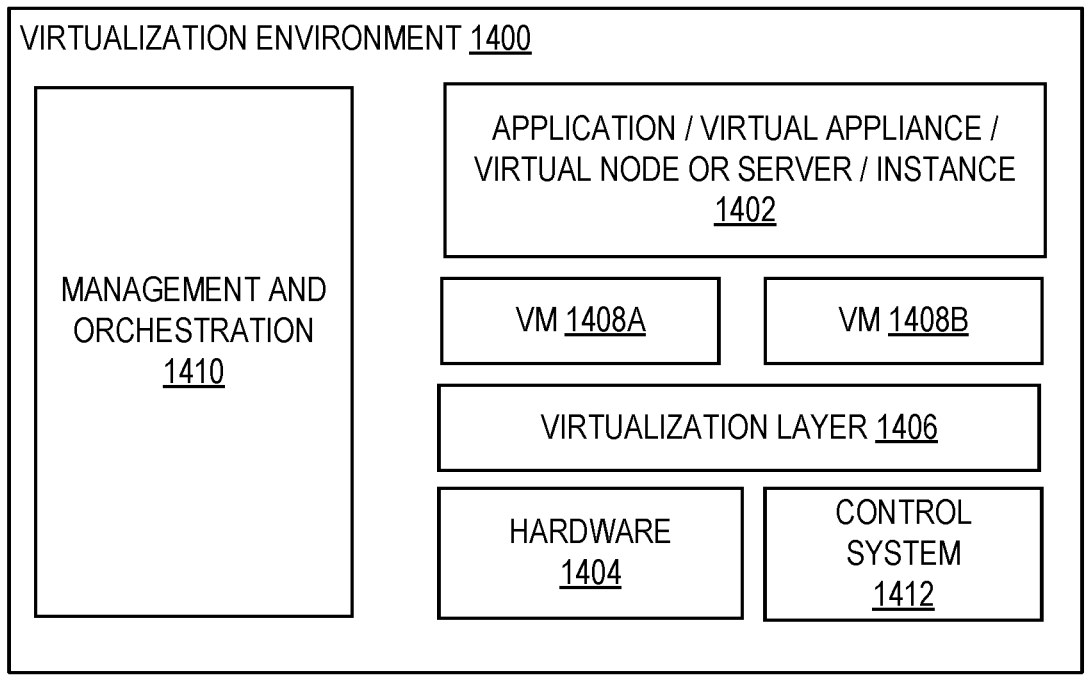
FIG. 14 is a block diagram of a virtualization environment in accordance with some embodiments.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1402 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1404 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1406 (also referred to as hypervisors or virtual machine monitors (VMMs)), provide VMs 1408a and 1408b (one or more of which may be generally referred to as VMs 1408), and/or perform any of the functions, features and/or benefits described in relation with some embodiments described herein. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g. such as in a data center or CPE) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

Figure 15:
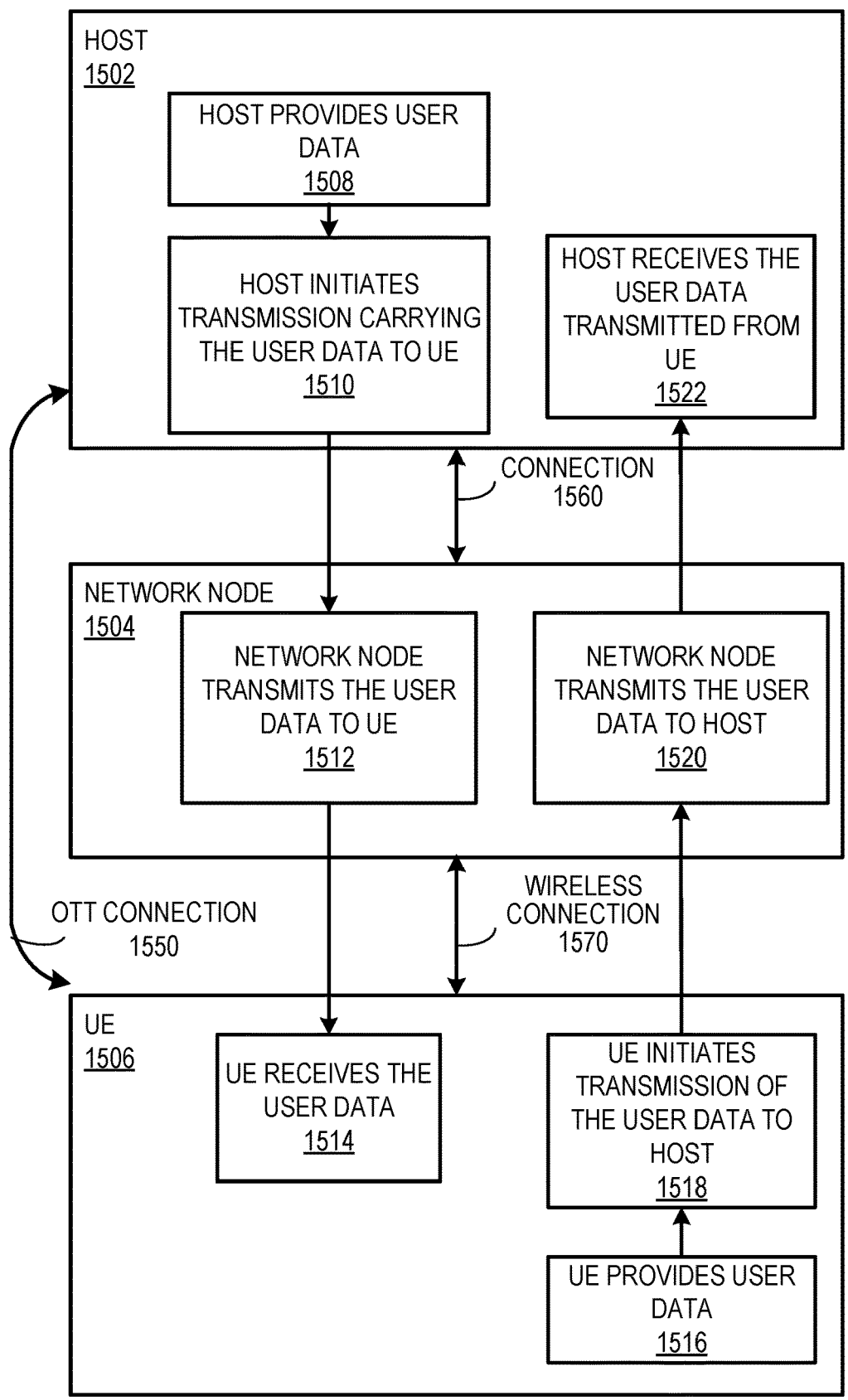
FIG. 15 is a block diagram of a host computer communicating via a base station with a user equipment over a partially wireless connection in accordance with some embodiments in accordance with some embodiments.

FIG. 15 shows a communication diagram of a host 1502 communicating via a network node 1504 with a UE 1506 over a partially wireless connection in accordance with some embodiments. Example implementations, in accordance with various embodiments, of the UE (such as a UE 1012a of FIG. 10 and/or UE 1100 of FIG. 11), network node (such as network node 1010a of FIG. 10 and/or network node 1200 of FIG. 12), and host (such as host 1016 of FIG. 10 and/or host 1300 of FIG. 13) discussed in the preceding paragraphs will now be described with reference to FIG. 15.

Like host 1300, embodiments of host 1502 include hardware, such as a communication interface, processing circuitry, and memory. The host 1502 also includes software, which is stored in or accessible by the host 1502 and executable by the processing circuitry. The software includes a host application that may be operable to provide a service to a remote user, such as the UE 1506 connecting via an over-the-top (OTT) connection 1550 extending between the UE 1506 and host 1502. In providing the service to the remote user, a host application may provide user data which is transmitted using the OTT connection 1550.

The network node 1504 includes hardware enabling it to communicate with the host 1502 and UE 1506. The connection 1560 may be direct or pass through a core network (like core network 1006 of FIG. 10) and/or one or more other intermediate networks, such as one or more public, private, or hosted networks. For example, an intermediate network may be a backbone network or the Internet.

The UE 1506 includes hardware and software, which is stored in or accessible by UE 1506 and executable by the UE's processing circuitry. The software includes a client application, such as a web browser or operator-specific "app" that may be operable to provide a service to a human or non-human user via UE 1506 with the support of the host 1502. In the host 1502, an executing host application may communicate with the executing client application via the OTT connection 1550 terminating at the UE 1506 and host 1502. In providing the service to the user, the UE's client application may receive request data from the host's host application and provide user data in response to the request data. The OTT connection 1550 may transfer both the request data and the user data. The UE's client application may interact with the user to generate the user data that it provides to the host application through the OTT connection 1550.

The OTT connection 1550 may extend via a connection 1560 between the host 1502 and the network node 1504 and via a wireless connection 1570 between the network node 1504 and the UE 1506 to provide the connection between the host 1502 and the UE 1506. The connection 1560 and wireless connection 1570, over which the OTT connection 1550 may be provided, have been drawn abstractly to illustrate the communication between the host 1502 and the UE 1506 via the network node 1504, without explicit reference to any intermediary devices and the precise routing of messages via these devices.

As an example of transmitting data via the OTT connection 1550, in step 1508, the host 1502 provides user data, which may be performed by executing a host application. In some embodiments, the user data is associated with a particular human user interacting with the UE 1506. In other embodiments, the user data is associated with a UE 1506 that shares data with the host 1502 without explicit human interaction. In step 1510, the host 1502 initiates a transmission carrying the user data towards the UE 1506. The host 1502 may initiate the transmission responsive to a request transmitted by the UE 1506. The request may be caused by human interaction with the UE 1506 or by operation of the client application executing on the UE 1506. The transmission may pass via the network node 1504, in accordance with the teachings of the embodiments described throughout this disclosure. Accordingly, in step 1512, the network node 1504 transmits to the UE 1506 the user data that was carried in the transmission that the host 1502 initiated, in accordance with the teachings of the embodiments described throughout this disclosure. In step 1514, the UE 1506 receives the user data carried in the transmission, which may be performed by a client application executed on the UE 1506 associated with the host application executed by the host 1502.

In some examples, the UE 1506 executes a client application which provides user data to the host 1502. The user data may be provided in reaction or response to the data received from the host 1502. Accordingly, in step 1516, the UE 1506 may provide user data, which may be performed by executing the client application. In providing the user data, the client application may further consider user input received from the user via an input/output interface of the UE 1506. Regardless of the specific manner in which the user data was provided, the UE 1506 initiates, in step 1518, transmission of the user data towards the host 1502 via the network node 1504. In step 1520, in accordance with the teachings of the embodiments described throughout this disclosure, the network node 1504 receives user data from the UE 1506 and initiates transmission of the received user data towards the host 1502. In step 1522, the host 1502 receives the user data carried in the transmission initiated by the UE 1506.

One or more of the various embodiments improve the performance of OTT services provided to the UE 1506 using the OTT connection 1550, in which the wireless connection 1570 forms the last segment. More precisely, the teachings of these embodiments may improve the spectral efficiency of access points while preserving the simplicity of the access points, efficiently use the fronthaul, and reduce energy consumption at the cell-site.

In an example scenario, factory status information may be collected and analyzed by the host 1502. As another example, the host 1502 may process audio and video data which may have been retrieved from a UE for use in creating maps. As another example, the host 1502 may collect and analyze real-time data to assist in controlling vehicle congestion (e.g., controlling traffic lights). As another example, the host 1502 may store surveillance video uploaded by a UE. As another example, the host 1502 may store or control access to media content such as video, audio, VR or AR which it can broadcast, multicast or unicast to UEs. As other examples, the host 1502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1550 between the host 1502 and UE 1506, in response to variations in the measurement results. The measurement procedure and/or the network functionality for reconfiguring the OTT connection may be implemented in software and hardware of the host 1502 and/or UE 1506. In some embodiments, sensors (not shown) may be deployed in or in association with other devices through which the OTT connection 1550 passes; the sensors may participate in the measurement procedure by supplying values of the monitored quantities exemplified above, or supplying values of other physical quantities from which software may compute or estimate the monitored quantities. The reconfiguring of the OTT connection 1550 may include message format, retransmission settings, preferred routing etc.; the reconfiguring need not directly alter the operation of the network node 1504. Such procedures and functionalities may be known and practiced in the art. In certain embodiments, measurements may involve proprietary UE signaling that facilitates measurements of throughput, propagation times, latency and the like, by the host 1502. The measurements may be implemented in that software causes messages to be transmitted, in particular empty or 'dummy' messages, using the OTT connection 1550 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

What is claimed is:

1. A method of operating a network node in a communications network for performing adaptive hybrid precoding, the network node being communicatively coupled to an access point via a fronthaul, the method comprising:
   determining an amount of available bandwidth on the fronthaul;
   determining whether to have the access point perform precoding of signals communicated between the access point and a communication device based on the amount of available bandwidth on the fronthaul;
   responsive to determining whether to have the access point perform the precoding, transmitting an indication to the access point indicating whether to perform the precoding; and
   communicating the signals with the communication device via the access point, wherein precoding of the signals is performed by the network node or the access point based on the indication.

2. The method of claim 1, wherein determining the amount of available bandwidth on the fronthaul comprises:
   determining a load on the fronthaul; and
   determining the available bandwidth on the fronthaul based on the load on the fronthaul and a capacity of the fronthaul.

3. The method of claim 1, wherein the access point is a first access point of a plurality of access points communicatively coupled to the network node via the fronthaul,
   wherein determining whether to have the access point perform the precoding comprises:
      determining a channel estimation overhead generated by each access point of the plurality of access points; and
      determining a number of access points of the plurality of access points for which the network node will perform precoding of signals associated with the respective access points, the number being based on the available bandwidth of the fronthaul and the channel estimation overhead generated by each access point of the plurality of access points.

4. The method of claim 3, wherein determining whether to have the access point perform the precoding further comprises determining a first set of access points of the plurality of access points for which the network node will perform the precoding of signals associated with the first set of access points, the first set of access points having the number of access points, and
   wherein transmitting the indication to the access point comprises transmitting the indication to each access point of the first set of access points indicating that the network node will perform the precoding of signals associated with the first set of access points.

5. The method of claim 4, wherein determining the first set of access points comprises determining the first set of access points based on at least one of:
   an average spectral efficiency associated with each access point of the plurality of access points,
   a power capability associated with each access point of the plurality of access points,
   hardware associated with each access point of the plurality of access points,
   a user load associated with each access point of the plurality of access points, or
   a number of hops along the fronthaul from the network node to each access point of the plurality of access points.

6. The method of claim 3, wherein determining whether to have the access point perform the precoding further comprises determining a second set of access points of the plurality of access points for which each access point of the second set of the access points will perform the precoding of signals associated with the respective access point, the second set of access points being based on the number of access points, and
   wherein transmitting the indication to the access point comprises transmitting the indication to each access point of the second set of access points indicating that the respective access point will perform the precoding of signals associated with the respective access point.

7. The method of claim 1, wherein the communications network comprises a hybrid precoding scheme in which the network node comprises a more robust precoder and the access point comprises a less robust precoder.

8. The method of claim 1, wherein the communications network is a cell-free massive multiple-input-multiple-output, MIMO, system, and
   wherein the network node comprises at least one of a radio access network, RAN, node or a core network, CN, node.

9. A network node in a communications network for performing adaptive hybrid precoding, the network node comprising:
- processing circuitry; and
- memory coupled to the processing circuitry and having instructions stored therein that are executable by the processing circuitry to cause the network node to perform operations comprising any of the operations of claim 1.

10. A network node in a communications network for performing adaptive hybrid precoding, the network node comprising:
- processing circuitry configured to perform any of the operations of claim 1; and
- power supply circuitry configured to supply power to the processing circuitry.

11. A computer program product comprising a non-transitory computer readable medium storing program code to be executed by processing circuitry of a network node, whereby execution of the program code causes the network node to perform operations comprising the operations of claim 1.

12. A method of operating a network node in a communications network for performing adaptive hybrid precoding, the network node being communicatively coupled to an access point via a fronthaul, the method comprising:
- determining an amount of available bandwidth on the fronthaul, wherein determining the amount of available bandwidth on the fronthaul comprises: determining a load on the fronthaul and determining the available bandwidth on the fronthaul based on the load on the fronthaul and a capacity of the fronthaul;
- determining whether to have the access point perform precoding of signals communicated between the access point and a communication device based on the amount of available bandwidth on the fronthaul; and
- responsive to determining whether to have the access point perform the precoding, transmitting an indication to the access point indicating whether to perform the precoding;

wherein determining the load on the fronthaul comprises:
- instructing the access point to perform a training phase in which at least one communication device transmits pilot tones to the access point for uplink channel estimation and the access point performs precoding for downlink transmission to at least one communication device;
- monitoring traffic on the fronthaul during the training phase; and
- determining the load on the fronthaul based on the traffic.

13. A method of operating an access point in a communications network for performing adaptive hybrid precoding, the access point being coupled to a network node via a fronthaul, the method comprising:
- receiving an indication from the network node indicating whether to perform precoding of signals communicated between the access point and a communication device;
- communicating the signals between the network node and the communication device, wherein precoding of the signals is performed by the network node or the access point based on the indication; and
- providing information associated with the access point to the network node, the information comprising at least one of:
  - a power capability of the access point,
  - hardware of the access point, or
  - a user load associated with the access point.

14. The method of claim 13, wherein the communication device is a first communication device,
the method further comprising:
- performing precoding for signals communicated between the network node and a second communication device via the access point.

15. The method of claim 14, wherein performing the precoding for the signals communicated between the network node and the second communication device via the access point comprises:
- receiving instructions from the network node to perform a training phase;
- subsequent to receiving the instructions, receiving pilot tones from the second communication device; and
- subsequent to receiving the instructions, precoding a signal for downlink transmission to the second communication device.

16. The method of claim 13, wherein the communications network is a cell-free massive multiple-input-multiple-output, MIMO, system, and
wherein the network node comprises at least one of a radio access network, RAN, node or a core network, CN, node.

17. An access point in a communications network for performing adaptive hybrid precoding, the access point comprising:
- processing circuitry; and
- memory coupled to the processing circuitry and having instructions stored therein that are executable by the processing circuitry to cause the access point to perform operations comprising any of the operations of claim 13.

18. An access point in a communications network for performing adaptive hybrid precoding, the access point comprising:
- processing circuitry configured to perform any of the operations of claim 13; and
- power supply circuitry configured to supply power to the processing circuitry.

\* \* \* \* \*